United States Patent
Fletcher et al.

(10) Patent No.: US 7,177,363 B2
(45) Date of Patent: Feb. 13, 2007

(54) SIGNAL PROCESSING SYSTEM AND METHOD

(75) Inventors: Paul Fletcher, Malvern (GB); Michael Dean, Malvern (GB)

(73) Assignee: Qineteq Limited (GB)

( * ) Notice: Subject to any disclaimer, the term of this patent is extended or adjusted under 35 U.S.C. 154(b) by 240 days.

(21) Appl. No.: 10/507,449

(22) PCT Filed: Mar. 7, 2003

(86) PCT No.: PCT/GB03/00971

§ 371 (c)(1),
(2), (4) Date: Sep. 13, 2004

(87) PCT Pub. No.: WO03/079489

PCT Pub. Date: Sep. 25, 2003

(65) Prior Publication Data

US 2005/0159108 A1    Jul. 21, 2005

(30) Foreign Application Priority Data

Mar. 16, 2002    (GB) .................. 0206312.1

(51) Int. Cl.
*H04L 27/28*    (2006.01)
*H04B 7/10*    (2006.01)
*H04B 1/10*    (2006.01)

(52) U.S. Cl. .................. 375/260; 375/347; 375/349
(58) Field of Classification Search ........ 375/232–236, 375/260, 341, 346, 347, 349, 350, 267; 455/562
See application file for complete search history.

(56) References Cited

U.S. PATENT DOCUMENTS 5,434,576 A    7/1995    Haupt (Continued)

FOREIGN PATENT DOCUMENTS

GB    2188782    10/1987

(Continued)

OTHER PUBLICATIONS

Scott, et al., "A Sparse Approach in Partially Adaptive Linearly Constrained Arrays", IEEE, pp. 541-544 (1994).

(Continued)

*Primary Examiner*—Don N. Vo
(74) *Attorney, Agent, or Firm*—McDonnell Boehnen Hulbert & Berghoff LLP

(57) ABSTRACT

A phased array antenna that employs a switched least means squared architecture comprises plurality of receiving elements each having a respective weighting unit associated therewith, a summation unit, a processor, a plurality of sampling devise and a switching unit contains a switch arm having a contact at its free and, an ADC and a plurality of switch contacts corresponding to the ends of channels connected to the respective sampling devices. Each of a plurality of receiving elements is ampled by a respective sampling device prior to an incoming signal subjected to complex weighting by respective weighting units. Each of the signals sampled by the sampling device passes along respective channels to the switching unit. Thus, by switching between the contacts it is possible to vary which of the receiving elements is sampled. The processor calculates new complex weighting coefficients to be applied to the incoming signals by the weighting units using the sampled incoming signals in order to minimize a difference between an output from the summation unit y and a training signal d.

18 Claims, 6 Drawing Sheets

U.S. PATENT DOCUMENTS

| | | |
|---|---|---|
| 6,229,486 B1 | 5/2001 | Krile |
| 2001/0046270 A1* | 11/2001 | Uchiki et al. ............... 375/341 |
| 2003/0125091 A1* | 7/2003 | Choi et al. .................. 455/562 |

FOREIGN PATENT DOCUMENTS

| | | |
|---|---|---|
| GB | 2219471 | 12/1989 |
| GB | 2357842 | 7/2001 |
| GB | 2372378 | 8/2002 |
| JP | 580201082 | 11/1983 |
| JP | 07038562 | 2/1995 |
| JP | 0802797980 | 10/1996 |
| JP | 10209734 | 8/1998 |
| JP | 2002107439 | 4/2002 |

OTHER PUBLICATIONS

Godara, et al. "Application of Antenna Arrays to Mobile Communications, Part II: Beam-Forming and Direction of Arrival Considerations", IEEE, pp. 1195-1245 (1997).

Bell, et al., "Adaptive Nulling for Multiple Desired Signals Based on Signal Waveform Estimation", IEEE, pp. 919-923 (1992).

* cited by examiner

SIGNAL PROCESSING SYSTEM AND METHOD

BACKGROUND OF THE INVENTION (1) Field of the Invention

This invention relates to a signal processing system and method.

(2) Description of the Art

It is known to minimise an error function derived from a comparison of an output of a phased array antenna and a known training signal. In prior art systems each input channel is sampled in order to estimate a gradient of the error function in each dimension of the error function, as shown in FIG. 1. A system with n channels results in an n dimensional complex vector error function being generated.

Adaptive beam control strategies for phased array antennas commonly exploit a Least Mean Squares (LMS) algorithm for training a phased array antenna to form optimum beams. The LMS algorithm is an iterative update algorithm. This means that it progressively updates the weights of the array antenna in time in such a manner as to minimise a specified cost function. In the case of LMS the cost function is a mean squared error which is defined as the difference between a beamformed output of the antenna and a known training sequence. The cost function is reduced by estimating the gradient of an error surface defined by the n-dimensional error function and then adjusting the array weights at each iteration of the algorithm so as to progressively reduce the error. The final solution will approach that of the optimum Wiener-Hopf solution. The LMS algorithm now is well understood.

Such adaptive control of array antennas is an attractive proposition for future high data-rate wireless local area networks. Benefits include co-channel interference suppression, electronically steerable directional gain and optimal combining. Array antenna control algorithms include the Least Mean Squares (LMS), Recursive Least Squares (RLS) and Direct Matrix Inversion (DMI) techniques.

It is usual to employ a least means square (LMS) minimisation, or other minimisation technique, in n-dimensions in order to reach a global minimum in the error function. As the minimisation calculations are typically performed digitally each input channel must have its analogue voltage sampled and digitised. This necessitates each channel having its own analogue to digital converter (ADC) which must be powered. In the case of a large number of input channels the power required to run the ADC's can become significant. This is particularly problematic in the case of mobile devices that have a limited power supply, for example a mobile telephone having a battery. A further problem associated with current sampling arrangements is that the necessity of each input channel having its own ADC adds significantly to the complexity and the cost of the system. This can be especially crucial in low cost, high volume communication devices, such as Bluetooth enabled devices where each Bluetooth chip typically currently (2002) costs around $5 and any additional costs are therefore significant.

Another problem associated with such systems is that they are computationally demanding as n-complex multiplications must be performed for each LMS iteration, in order to simultaneously minimise each of the n-vector dimensions (for a system with n channels in the array of the antenna).

In the case where the LMS technique is used it is the negative of the gradient of the error of the n dimensional error surface that is minimised according to the following equation:

$$\underline{\omega}_{k+1} = \underline{\omega}_k + \mu \epsilon' \underline{x}_n$$

Where $\underline{\omega}_k$ is the complex weighting vector applied to the elements at the $k^{th}$ iteration.

$\mu$ is the step size.

$\epsilon'$ is the complex conjugate of the error between the desired signal and the received signal.

$\underline{x}_n$ is the complex vector sampled from the n input channels.

SUMMARY OF THE INVENTION

It is an aim of the present invention to provide a signal processing system that, at least partially, ameliorates at least one of the above mentioned problems and/or difficulties.

It is another aim of the present invention to provide a method of signal processing that, at least partially, ameliorates at least one of the above mentioned problems and/or difficulties.

According to a first aspect of the present invention there is provided a signal processing system comprising a plurality of input channels, sampling means adapted to obtain a first signal sample from at least a first of the plurality of input channels at a first time and a second signal sample from a second of the plurality of input channels at a second time, switching means for switching said sampling means between input channels, and processing means for processing said signal samples, the processing means being arranged to generate an output suitable for sending to beamforming means, said output being related to at least one weighting co-efficient associated with at least one of said input channels and being generated using an iteration of an error minimisation routine executed by the processing means using said first signal sample to cause a first output at a first time and using said second signal sample to cause a second output at a second time, wherein the sampling means is arranged to sample each input channel in a predetermined order and the processing means is arranged to determine an input channel which makes a significant contribution to a gradient of an error function and to use a signal from said channel in the error minimisation routine.

An input channel making significant contribution to the gradient of the error function may constitute an input channel which when ranked by contribution to the gradient of the error function is within any one of the following top percentiles of the sampled signals: 1%, 5% 10%, 25%, 50%.

This system, at its simplest, requires only a single ADC and therefore has reduced complexity, power consumption and cost when compared to prior art arrangements. Additionally, only a single complex calculation need be made in order to execute each minimisation iteration thus the computational requirements of such a system are reduced compared to prior art arrangements. This reduces the cost of implementation of a system according to the present invention compared to prior art arrangements. A plurality of channels have their signals sampled by a common sampling means.

The 'maximum gradient' approach to selecting which channel to converge speeds up the convergence process when compared to ordered or random sampling of the input channels despite, the 'sniffing' of each input channel in order to determine which one contributes most to the gradient of the error function. "Sniffing" does not incur a computational penalty since there are no calculations performed during "sniffing", calculations are only performed upon the maximum gradient signal. This is because sequential or random sampling does not find the steepest paths down the error function whereas the 'maximum gradient' arrangement does. This approach also leads to a result that is closer to a full n-dimensional approach than randomly, or sequentially, varying the sampled channel.

The processing means may be arranged to determine which input channel has the largest contribution to the gradient of the error function and use the signal from said channel in the error minimisation routine.

The sampling means may include an ADC. The sampling means may be arranged to sample the sampled input channels on a symbol by symbol basis. This allows error minimisation to occur at the end of each symbol period of a training period. The system may be arranged to achieve convergence to a minima of an error function within a half, a third, or a quarter of a period of the training period. For example a Bluetooth access code period is typically 74 symbol periods and convergence may be reached in about 20 symbol periods or better. The symbols may be in the form of any of the following: quadrature amplitude modulation (QAM), binary phase shift keying (BPSK), quaternary phase shift keying (QPSK) Gaussian-filtered minimum shift keying (GMSK), 16QAM or any M-ary signalling scheme.

In telecommunications applications a symbol is a pattern within in a signal that is used to represent a signal state. A symbol period is the transmission duration of the symbol.

There may be provided a plurality of sampling means, typically up to four. This is a typical number of sampling means for a low cost system.

The switching means may be a solid state switch. The switching means may be arranged to switch between input channels in a controlled manner, for example each turn, or in an order determined by an analysis of the sample signals from the channels, or randomly.

The error minimisation routine may be either of a least squared minimisation (LMS), a recursive least square minimisation (RLS), direct matrix conversion (DMI) routine or some other routine.

According to a second aspect of the present invention there is provided a method of signal processing comprising the steps of:
 i) sampling a sample signal of a subset of a plurality of input channels;
 ii) reducing an error function using said sample, using digital processing means;
 iii) switching between the subset and another subset of the plurality of input channels using switching means, or resampling the same subset as in step (i); and
 iv) determining which of the input channels make significant contributions to a gradient of the error function and switching to a subset of the plurality of input channels including at least one of said channels prior to step (iii).

The method may include defining an input channel making significant contribution to the gradient of the error function constitutes an input channel, which when ranked by contribution to the gradient of the error function, is within any one of the following top percentiles of the sampled signals: 1%, 5% 10%, 25%, 50%.

The method may include determining, at step (iv), which of the input channels makes the largest contribution to a gradient of the error function and switching to said channel prior to step (iii).

The method may include repeating steps (i) to (iii), iteratively, in order to obtain a minima in the error function.

The method may include generating at least one weighting coefficient associated with the subset of input channels based upon the result of the reduction of the error function.

The method may include sampling a subset of analogue signals at step (i) and may further include digitising the analogue samples prior to step (ii).

Preferably the method includes comprising the subset of significantly fewer input channels than the total number of input channels, for example if there are n input channels the subset may contain n/2, n/4, n/10 channels. More preferably the method includes comprising the subset of single input channel The method may include sampling signals in the spatial domain.

The method may include deciding whether to sample the same, or another, of the plurality of analogue signal channels based upon an assessment of each channel's contribution to a gradient of the error function.

The method may include comparing an output from a phased array antenna and a training signal to generate the difference signal.

The method may include sampling each of the analogue signal channels either in an ordered sequence or randomly.

The method may include switching between the plurality of channels between sampling steps using switching means, for example a solid state switch or a mechanical switch. Typically this involves switching between channels either randomly or in an ordered sequence.

The method may include achieving convergence of the error function to a minimum of the function within a half, a third or a quarter of a period of a training signal. The method may include sampling the input channels on a symbol by symbol basis, for example at the end of a symbol period. The method may include achieving convergence of the error function to a minimum of the function within the period of a training signal.

The method may include providing a single ADC for digitisation of an analogue input signals. Alternatively the method may include providing fewer ADC's than there are input channels for digitisation of analogues input signals. Typically less than four ADC's will be provided, usually two or three.

According to a third aspect of the present invention there is provided a method of determining a minima of an n-dimensional error function comprising the steps of:
 i) selecting at least one of the n-dimensions;
 ii) estimating a gradient of the error function in the at least one dimension;
 iii) reducing the value of the error function using the gradient of the error function; and
 iv) repeating steps (i) to (iii) until a minima is attained.

The method may include selecting the at least one dimension in an ordered sequence or randomly. Alternatively, the method may include selecting the at least one dimension according to which of the n-dimensions has the largest gradient.

According to a fourth aspect of the present invention there is provided an adaptive filter comprising a plurality of input channels, a switch, a processor, said switch being arranged to switch a subset of said input channels in and out of operative communication with the processor such that said processor processes sample signals from different channels at different times.

The processor may be arranged to process said sample signals so as to create respective adaptive profile of weighting coefficients for each respective of said input channels.

Preferably there is provided an ADC intermediate said switch and said processor. Advantageously, there are provided fewer ADC's than there are input channels. More advantageously, the switch is arranged to switch which input channels are connected to the, or each, ADC. Most advantageously there is provided only one ADC.

The processor may be arranged to process the signals so as to minimise an error function. The switch may be arranged to switch iteratively between different channels. The switch may be arranged to iteratively switch between different subsets of said channels and said processor may be arranged to process sample signals from different subsets of said channels at different times.

According to a fifth aspect of the present invention there is provided a method of adaptive filtering comprising obtaining a sample signal, or signals, from a plurality of channels and using the sample signals to form at least one weighting coefficient for at least one of the channels, the weighting coefficients being obtained by performing an error function reduction iteration associated with the difference between the sampled signal, or signals, and a reference values, the error function being reduced by operating on a sample signal, or signals, from a subset of the available channels that is smaller than the number of available channels, and changing the channel, or channels, present in the subset between at least two iterations of the reduction of the error function.

The method may include providing switching means to switch between subsets of channels. The method may include providing a subset of channels that are significantly smaller than the total number of channels, for example if there are n channels the subset will typically comprise n/2, n/4, or n/10 channels. Preferably the subset comprises a single channel.

Desirably the method comprises providing an ADC to digitise the sample. More desirably there is provided only one ADC.

Advantageously the method include changing the channels present in the subset between successive iterations.

According to a sixth aspect of the present invention there is provided a telecommunications system including a signal processing system according to the first aspect of the present invention and/or capable of executing the method of either of the second or third aspects of the present invention.

The telecommunications system may be a wireless local area network (WLAN). The WLAN may be arranged to transmit data in an unlicensed region of the electromagnetic spectrum. The unlicensed region may be the industrial, scientific and medical band (ISM). The WLAN may employ either, or both, of Bluetooth or IEEE 802.11b protocols.

The signal processing system may be an access point. The access point may be arranged to select network access codes. The access point may be arranged to control network usage, typically by scheduling unused network frequencies and/or reuse of network frequencies. This minimises interference between piconets operating within the same geographical area.

The access point may either spatially null, (exclude), a network element from a piconet or it may focus radiation upon a network element (thereby including it within a piconet). Thus, the access point can, typically, determine which network elements are to be included in a given piconet thereby reducing interference between radiators that are within the same geographical area.

The access point may be arranged to process signals in a spatial domain. This allows the reduction in the number of channels for which sampling must occur over current systems that use error function minimisation as a filtering technique and therefore process signals in the temporal domain in which case it is not sensible to exclude any input channels from the minimisation process.

According to a seventh aspect of the present invention there is provided a method of increasing the number of users that can access a telecommunications channel of a given bandwidth incorporating the methods of either of the second or third aspects of the present invention.

The method may include processing input channel signals in the spatial domain.

According to a eighth aspect of the present invention there is provided an access point in accordance with the first aspect of the present invention and/or capable of executing the method of either of the second or third aspects of the present invention.

According to a ninth aspect of the present invention there is provided a program storage device readable by a machine and encoding a program of instructions which when operated upon the machine cause it to operate as a system according to the first aspect of the present invention.

According to a tenth aspect of the present invention there is provided a computer readable medium having stored therein instructions for causing a device to execute the method of either of the second or third aspects of the present invention.

According to an eleventh aspect of the present invention there is provided a signal processing system substantially as hereinbefore and hereinafter described with reference to the accompanying drawings.

According to a twelfth aspect of the present invention there is provided a method of signal processing substantially as hereinbefore and hereinafter described with reference to the accompanying drawings.

According to a thirteenth aspect of the present invention there is provided a telecommunications system substantially as hereinbefore and hereinafter described with reference to the accompanying drawings.

According to a fourteenth aspect of the present invention there is provided an adaptive filter substantially as hereinbefore and hereinafter described with reference to the accompanying drawings.

According to a fifteenth aspect of the present invention there is provided a method of adaptive filtering substantially as hereinbefore and hereinafter described with reference to the accompanying drawings.

According to another aspect of the present invention there is provided a signal processing system comprising a plurality of input channels, sampling means adapted to obtain a first signal sample from at least a first of the plurality of input channels at a first time and a second signal sample from a second of the plurality of input channels at a second time, switching means for switching said sampling means between input channels, and processing means for processing said signal samples, the processing means being arranged to generate an output suitable for sending to beamforming means, said output being related to at least one weighting co-efficient associated with at least one of said input channels and being generated using an iteration of an error minimisation routine executed by the processing means using said first signal sample to cause a first output at a first time and using said second signal sample to cause a second output at a second time.

According to yet another aspect of the present invention there is provided a method of signal processing comprising the steps of:

i) sampling a sample signal of a subset of a plurality of input channels;
ii) reducing an error function using said sample, using digital processing means; and
iii) switching between the subset and another subset of the plurality of input channels using switching means, or resampling the same subset as in step (i).

DESCRIPTION OF THE FIGURES

The invention will now be described, by way of example only, with reference to the accompanying drawings, of which.

DESCRIPTION OF A PREFERRED EMBODIMENT

Figure 1:
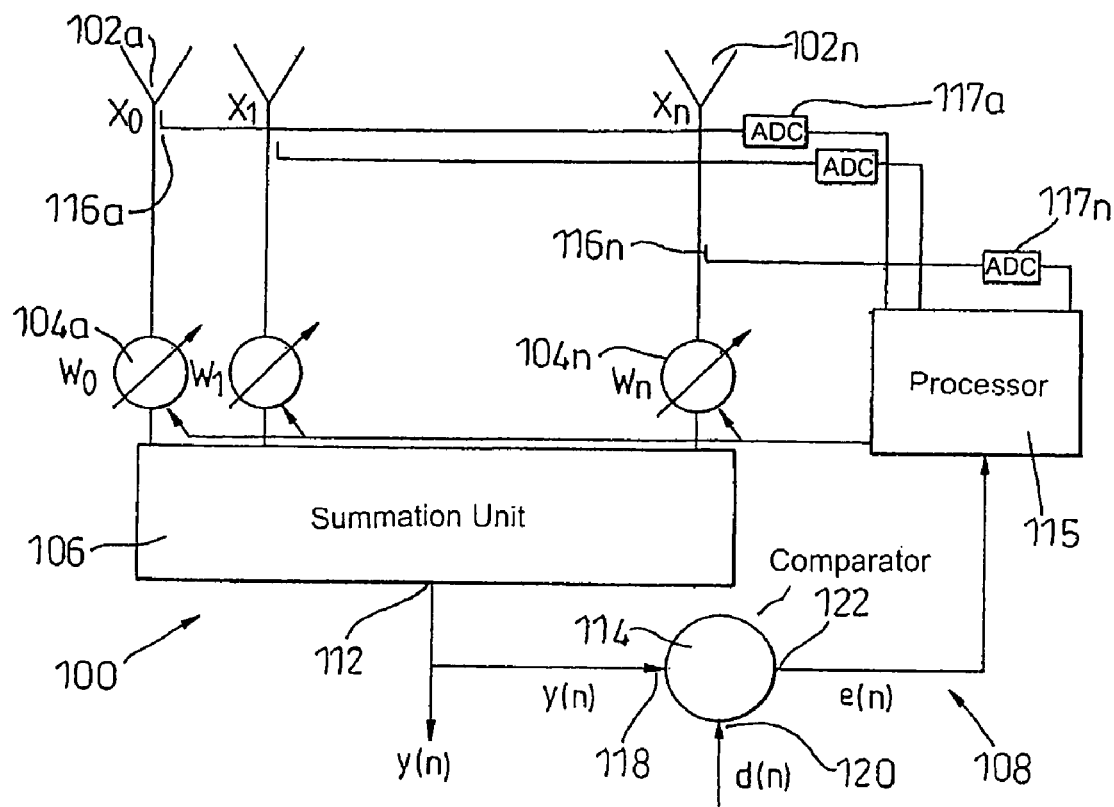
FIG. 1 is a schematic representation of a prior art phased array antenna architecture incorporating conventional least means squared processing.

Referring now to FIG. 1, a phased array antenna 100 employing a conventional least means squared (LMS) architecture comprises a plurality of receiving elements 102a–n each having a respective weighting unit 104a–n associated therewith, a summation unit 106 and control electronics 108. Typically the numer of receiving elements in an array varies with the desired degree of accuracy of the systems. This is because the more elements present in an array the higher the number of degrees of freedom of the systems.

The summation unit 110 has an output 112 that is the summation of all the beamformed input signals from the receiving elements 102a–n. The control electronics 108 comprises a comparator 114, a processor 115, sampling devices 116a–n, typically an inductive coupling device, and analogue to digital converters (ADC) 117a–n.

The comparator 114 has first and second inputs 118, 120 and an output 122. The first input 118 receives a portion of the signal, y(n), from the output 122. The second input 120 receives a training signal, d(n), that should, if the weights applied by the weighting units 104a–n are correct, correspond to the expected output from the summation unit 110.

The comparator 114 generates an error function signal, e(n), based upon the difference between the output signal y(n) and the training signal d(n) that is output to the processor 115 via the output 122.

Each of the receiving elements 102a–n is sampled by its respective sampling device 116a–n. The sampled analogue signal is digitised using a respective one of the plurality of ADC's 117a–n and passed to the processor 115. Each channel 102a–n having an associated ADC 117a–n results in both the cost and the power consumption of the prior art arrangement increasing over that of a system according to the present invention.

The processor 115 reduces the error functions, e(n), by iteratively applying the following vector least means squared algorithm in n-dimensions, where n is the number of receiving elements 102a–n:

$$\underline{\omega}_{k+1} = \underline{\omega}_k + \mu \epsilon' \underline{x}_n$$

This algorithm reduces the error function signal, e(n), between the signal output from the summation unit 110 and the training signal by varying the complex weighting functions applied to the weighting units 104a–n in order to vary the output signal from the summation unit 110 such that the error surface formed by the error function, e(n), is descended in the direction of maximum gradient. An estimate of the gradient vector at each iteration is obtained from the product of the error signal and a 'snapshot' of each of the vector of signals received at the receiving elements 120a–n. The convergence time of the algorithm is sufficiently short that a near zero signal is achieved, subject to random signal noise, before the coherence time, i.e. the length of time for which the training signal is valid, of the training signal is exceeded.

Figure 2:
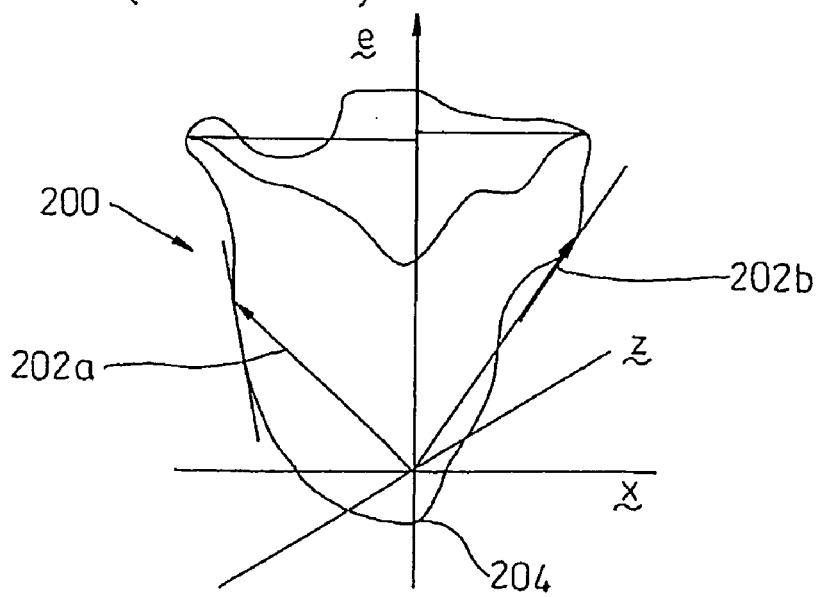
FIG. 2 is a representation of an n-dimensional error surface associated with the n-element phased array antenna of FIG. 1.

Referring now to FIG. 2, an n-dimensional error surface 200 is constructed of n vectors 202a,b (only 2 shown) and is generally quadratic in form. In a full LMS analysis the phase and amplitude of each of these vectors must be compared with respective signals from the input channels 102a–n simultaneously in order to move towards a minimum 204 of the error surface 200.

Figure 3:
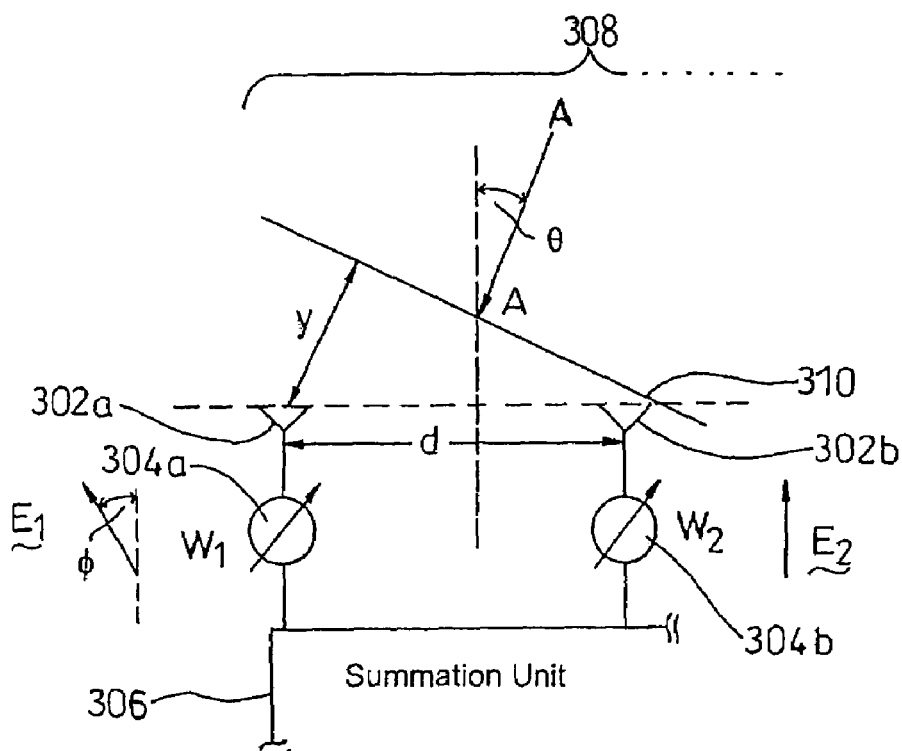
FIG. 3 is a representation of a wavefront impinging upon two elements in an array aperture of the antenna of FIG. 1.

Referring now to FIG. 3, a wavefront 310 is incident upon the array aperture 308, at an angle θ to the normal of the aperture 308, along a vector A—A. Considering two adjacent receiving elements 302a,b the wavefront 310 must travel an additional distance y after being received by the element 302b before being received by the element 302a. From simple geometric consideration it can be seen that y=d sin θ. This extra distance of travel introduces a phaseshift between the wavefront received at the two elements 302a,b of $$\phi = \left(\frac{2\pi}{\lambda}\right) d \sin\theta.$$

The weighting units 308a,b apply a correction in order that the electric vectors of the respective fractions of the wavefront detected at the receiving elements 302a,b are aligned prior to passing to the beamformer 306 to be summed. Thus, it can be seen that by altering the phase correction applied to the detected fractions of the wavefront 310 the antenna array can be spatially scanned as each direction will exhibit a unique phase relationship between the receiving elements 302a–n.

Also it can be seen that directions can be spatially filtered by weighting the phase corrections to the receiving elements such that the sum of the fractions of the E vector of a wavefront from the desired directions detected by the receiving elements is zero. This is achieved by weighting the phase corrections such that the fractions of the E vector detected are in antiphase to each other and therefore sum to zero. This is termed "nulling".

Whilst nulling increases the number of radiators that can be accommodated within a channel, by spatially deselecting radiators to which the channel is not open, only a limited number of directions can be excluded from any given channel. The number of directions that can be excluded from a channel is determined by the number of degrees of freedom of the sensor array. For a sensor array having n elements there are n−1 degrees of freedom that can be nulled.

Figure 4:
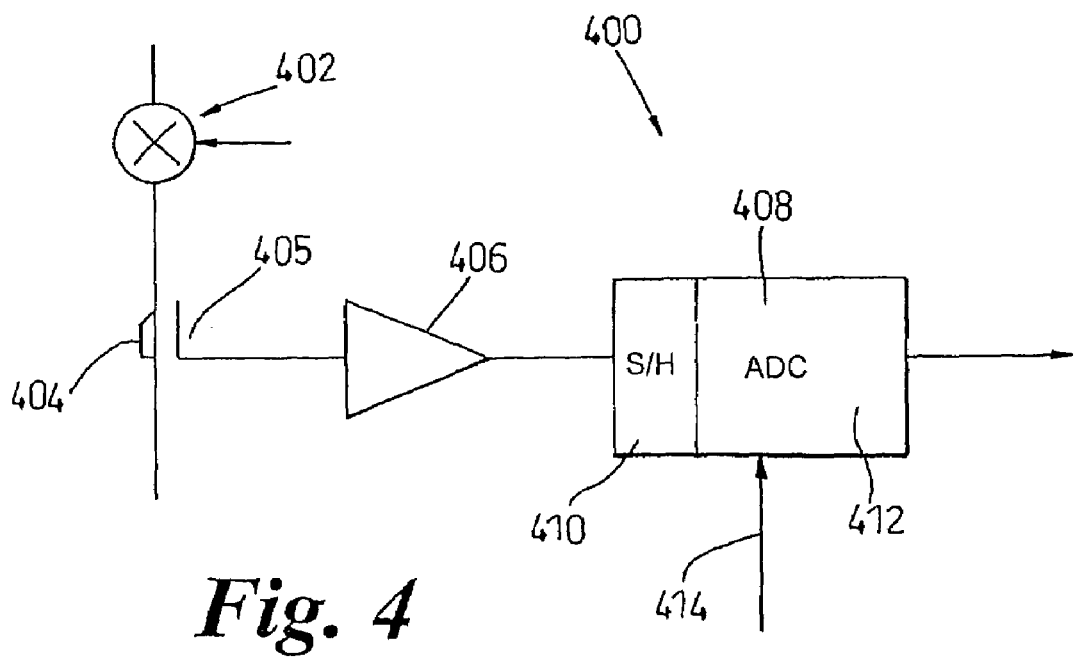
FIG. 4 is a schematic representation of a signal coupling arrangement of the antenna of FIG. 1.

Referring now to FIG. 4, a signal coupling arrangement 400, such as may be used in sampling devices 116, comprises a local oscillator (LO) 402, a coupling region 404, a signal pick up 405, an amplifier 406, an ADC 408. The ADC 408 includes a sample-and-hold circuit 410, an ADC unit 412 and a clock input 414.

A signal passes from the LO 402 to the coupling region 404 where the pick up 405 is, typically, inductively coupled to the coupling region 404. The coupled signal is then amplified by the amplifier 406 and passes to the ADC 408. The digitised signal is then input to the processor 115 and is processed in order to calculate a complex weighting coefficient for the signal.

The calculated adaptive complex weighting coefficients are passed to the respective weighting units 104a–n.

The foregoing discusses the prior art.

Figure 5:
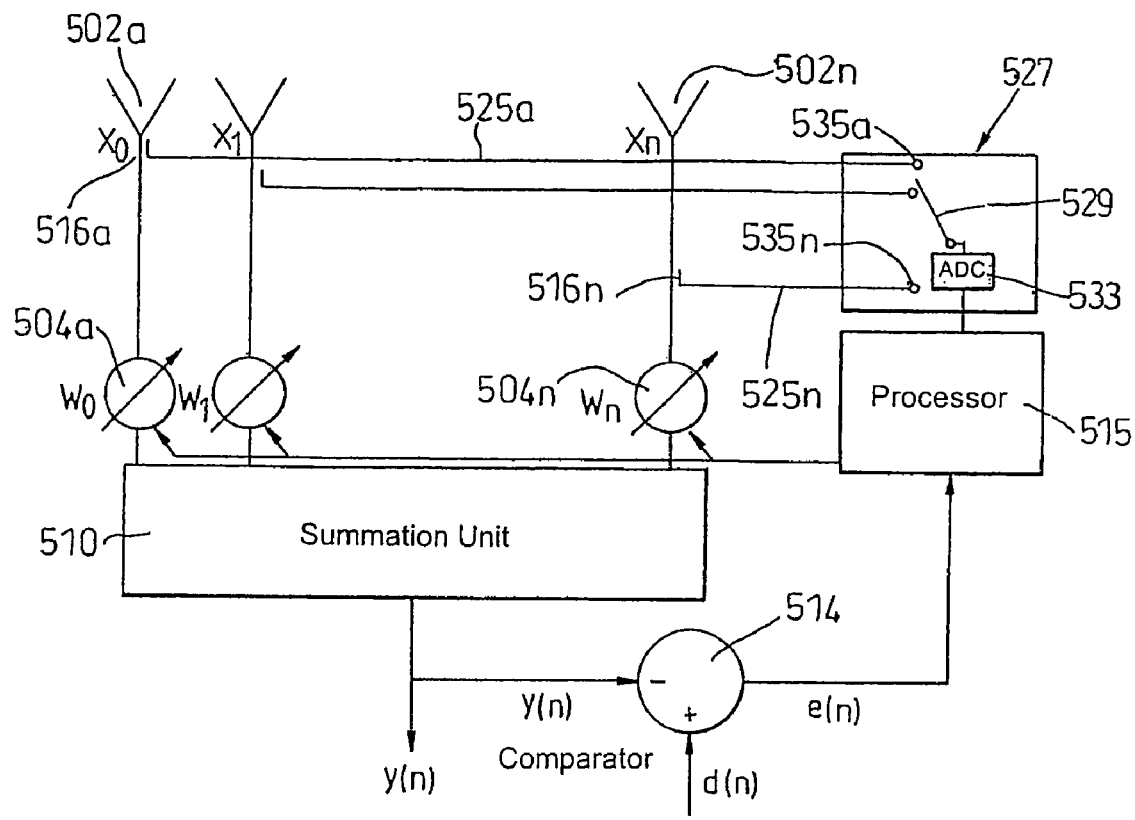
FIG. 5 is a schematic representation of a phased array antenna architecture incorporating switched least means squared processing according to an aspect of the present invention.

Referring now to FIG. 5, this shows a new phased array antenna 500 that employs a switched LMS architecture and is substantially similar to the phased array antenna 100 of FIG. 1, similar parts thereto are accorded the same reference numerals in the five hundred series.

The phased array antenna 500 comprises a plurality of receiving elements 502a–n each having a respective weighting unit 504a–n associated therewith, a summation unit and control electronics.

The summation unit outputs a signal to the control electronics that is the summation of all of the beamformed input signals from the receiving elements 502a–n. The control electronics comprises a comparator 514, a processor 515, and a sampling devices 516a–n, typically an inductive coupling device.

The weighted signals pass to a summation unit 510 from where a summed signal, y(n), is output. A portion of the summed signal is input to a comparator 514, as is a training signal d(n). The training signal is, of course, of known sequence/form. An error function signal e(n) that is the difference between the summed signal y(n) and the training signal d(n) is output to a processor 515.

Each of a plurality of receiving elements 502a–n is sampled by a respective sampling device 516a–n prior to an incoming signal being subjected to complex weighting by respective weighting units 504a–n.

Each of the signals sampled by the sampling device 516a–n passes along a respective data channel 525a–n to a switching unit 527. The switching unit 527 contains a switch 529, typically a solid state switch, an ADC 533 and a plurality of switch contacts 535a–n corresponding to the ends of the data channels 525a–n. Of course, mechanical or other switches could be used instead of a solid state switch.

Within the switching unit 527 a single switch contact 535a is closed with the switch 529 corresponding to a single receiving element 502 at each iteration of an LMS algorithm. The processor 515 makes an estimate of the component of the error vector at each iteration and a single complex weight of the weight vector corresponding to that to be applied to the receiving element 502a is updated.

The processor 515 reduces the error functions, e(n), by iteratively applying the following vector least means squared algorithm in a single dimension, in the above mentioned case that corresponding to the receiving element 502a, (the receiving element sampled may of course vary between iterations):

$$\omega_{k+1} = \omega_k + \mu \epsilon' x$$

This algorithm reduces the error function signal, e(n), between the signal output from the summation unit 510 and the training signal by varying the complex weighting function applied to a single weighting unit, in the above mentioned case weighting unit 504a–n in order to vary the output signal from the summation unit 510.

By switching between the contacts 535a–n it is possible to vary which of the receiving elements is sampled. Thus the n-dimensional error function shown in FIG. 2 can be broken down into n individual one dimensional error functions. A minima of the overall multi-dimensional error function can be obtained by traversing a combination of these individual one dimensional error functions.

An estimate of the gradient of the one dimensional error function is obtained from a product of a 'snapshot' of the sampled incoming signal vectors, i.e. phase and amplitudes, and the error signal. Thus, it is only necessary to execute a three complex calculations per iteration in order to modify the weighting coefficients compared to 3n simultaneous complex calculations of the prior art.

This results in a reduction in the computational complexity of the LMS algorithm as only two complex scalar multiplications and a single complex addition are required to reduce the error function e(n) at each iteration. This is offset against an increased convergence time compared to a full n-dimensional analysis due to a slower rate of descent of the error surface. However, provided convergence to a minimum of the error function occurs before the coherence time of the training signal expires this is not a problem. Typical Bluetooth training signals are valid for seventy four to seventy eight symbol periods and convergence can be reached within twenty symbol periods using the maximum gradient technique.

It will be appreciated that although shown as only having a single ADC the antenna 500 will benefit from reduced power consumption, cost and ease of construction over prior art systems provided that fewer ADC's than the total number of input channels are employed.

Figure 5A:
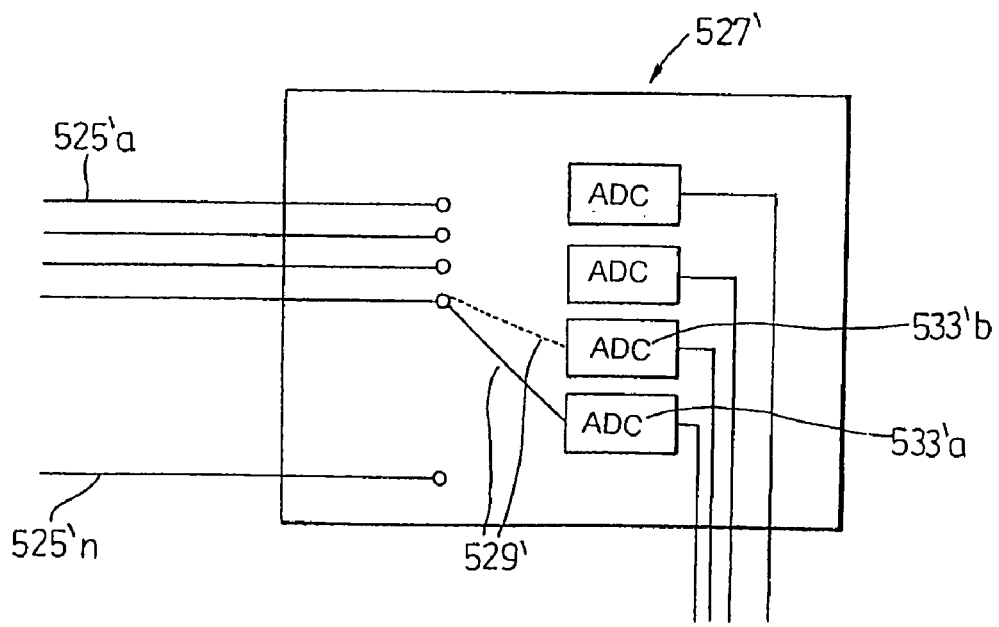
FIG. 5a is a schematic representation of a switching unit of an alternative embodiment of a phased array antenna architecture incorporating switched least means squared processing according to an aspect of the present invention.

Referring now to FIG. 5a, it can be advantageous to employ a number of ADC's 553'a–d in order to traverse the error surface in a number of dimensions simultaneously, by altering more than one weighting coefficient at each iteration, and thereby achieve convergence more quickly in systems where the coherence time of the training signal is short whilst still maintaining the power, cost and computational savings of a system according to the present invention over the prior art arrangements.

Additionally, the provision of more than one ADC 533'a–d increases the redundancy of the system as if one ADC 533'a should fail the switch 529' can switch not only between data channels 525'a–n but also to another ADC 533'b in order to counteract the effect of the ADC 533'a that has failed.

It has been found that for Bluetooth applications four or less ADC's are typically sufficient to achieve convergence at a suitable rate.

Figure 6:
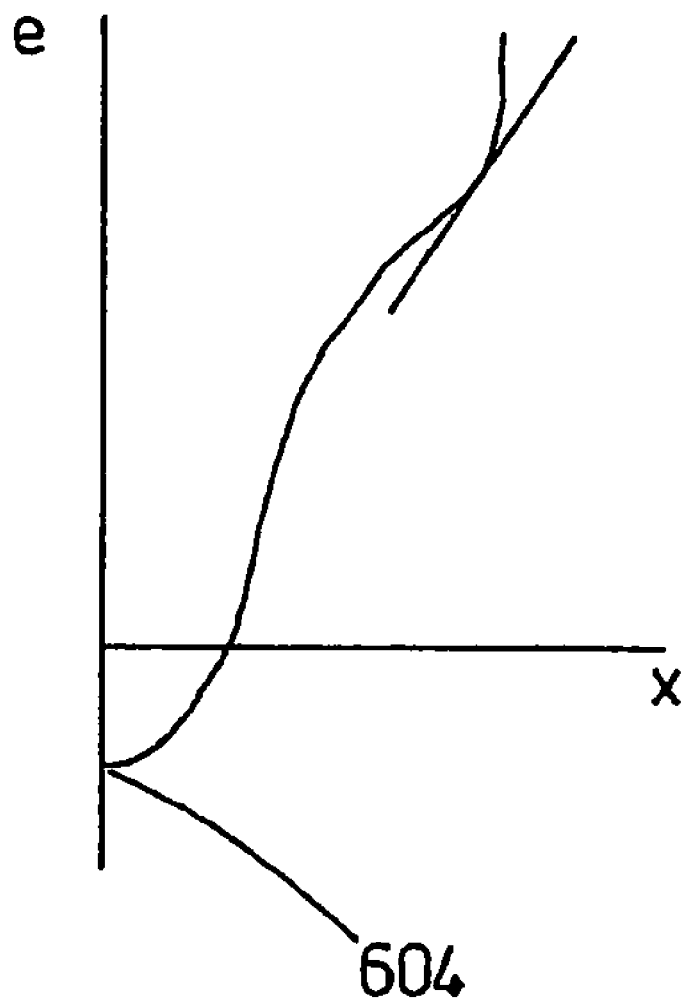
FIG. 6 is a representation of a one dimensional error surface associated with a single element of the phased array antenna of FIG. 5.

Referring now to FIG. 6, a one-dimensional error surface 600, corresponding to that defined by the vector 202b of FIG. 2, is shown. The global minimum 604 is achieved by traversing small portions of a number of the one-dimensional error surfaces associated with each of the n-vectors.

Figure 7:
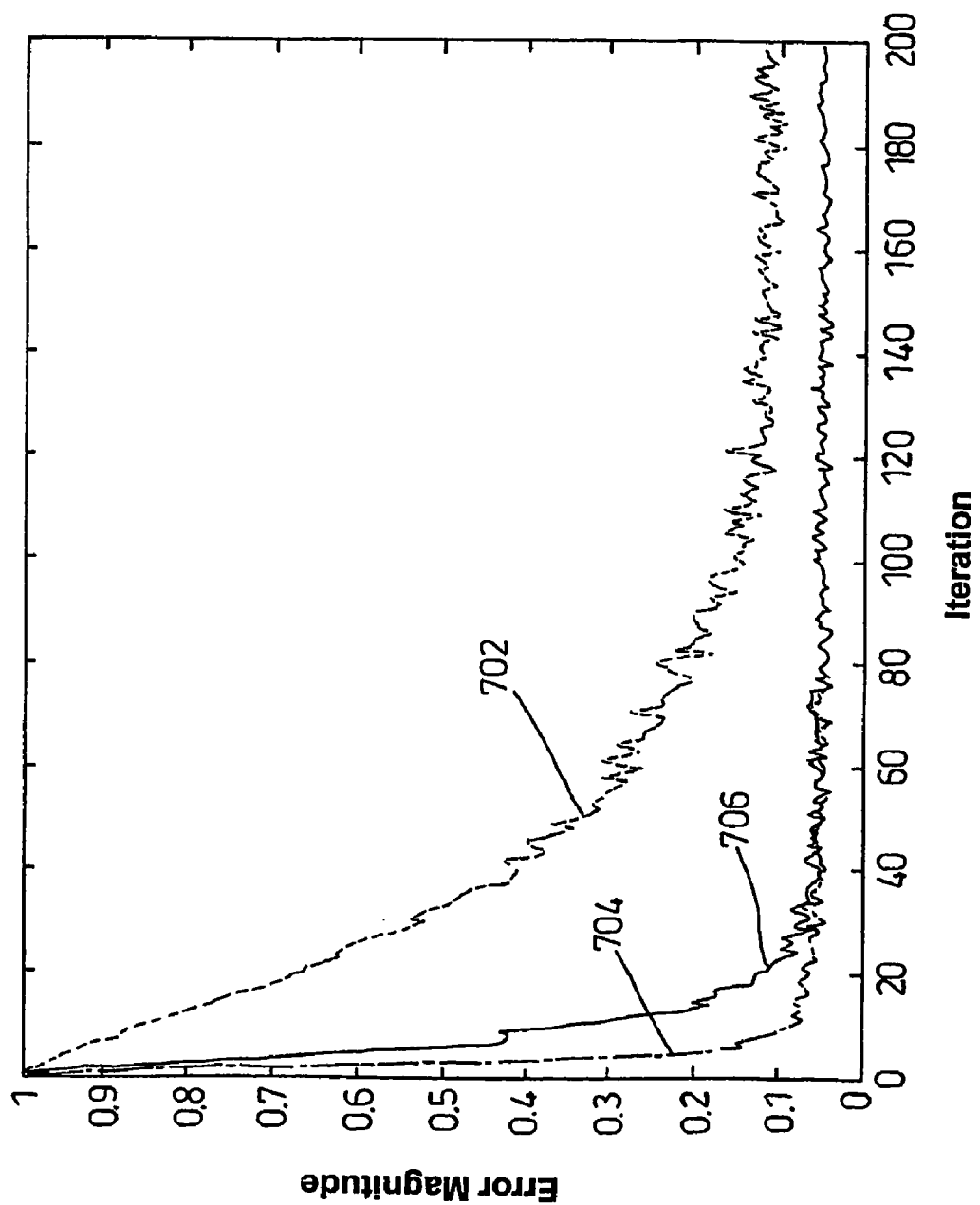
FIG. 7 is a graph showing the calculated performance of various least mean squared architectures.

A number of different switching schemes are available to switch between receiving element 502a–n. The results of two different switching schemes are shown compared to a full LMS architecture in FIG. 7.

Curve 702 shows a random switched LMS architecture. By this is meant that the sampling device 516 that provides the signal that is to be used to move down the gradient if the error surface is chosen periodically at random. This does not converge particularly quickly compared with a full LMS architectural curve 704, in the example shown approximately one fifth the rate of the full LMS architecture. Indeed at the end of a typical Bluetooth training period, typically seventy-eight iterations (symbol periods), the error magnitude of the random switched LMS architecture is approximately twice that of the full LMS architecture. Ordered, sequential switching between receiving elements, $x_0, x_1 \ldots x_n$, has the same effect as random switching.

Curve 706 shows the switching between each of the input channels 502a–n, sequentially by maximum gradient (ie in turn, one after the other, with the sequence being determined by the gradient of the channel signal) and sampling them. An estimate of the gradient of each one dimensional error functions is made. The processor 515 selects the channel with the maximum gradient and the switching unit 527 selects that channel for the next step of the error minimisation. The weighting coefficient $\omega_x$ is then altered for the receiving element making the greatest contribution to the gradient of the error function and moving down the gradient. This sampling and selection of the channel with the maximum gradient is repeated before each iteration.

This maximum gradient switched LMS arrangement leads to convergence with the full LMS treatment after approximately thirty interactions. This is well within the training period of most protocols, for example the Bluetooth training period is seventy four to seventy eight symbol periods (iterations).

Figure 8:
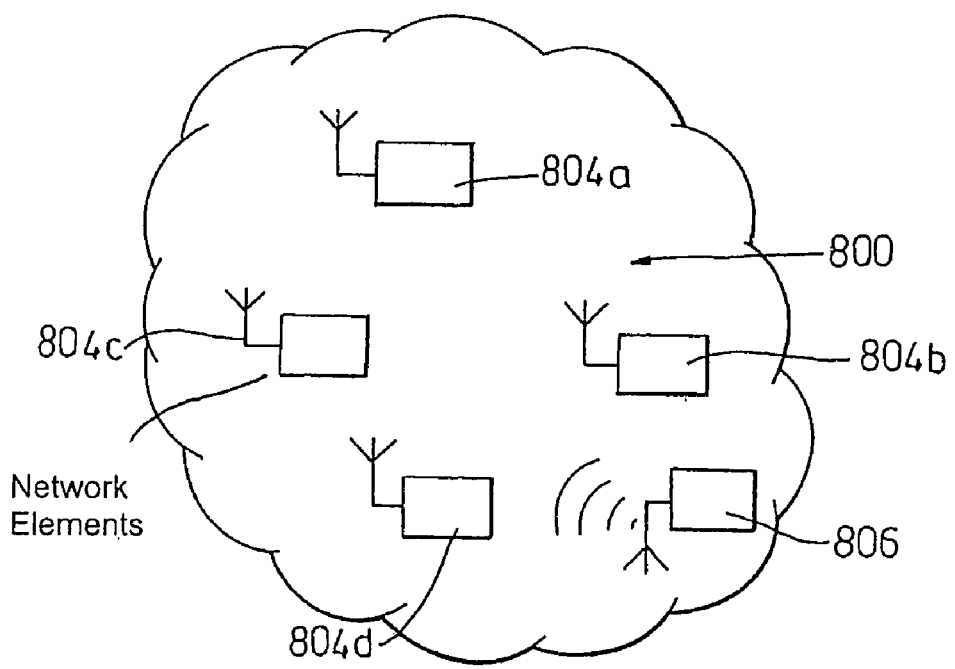
FIG. 8 is a schematic representation of a wireless local area network (WLAN) employing spatial nulling including a phased array antenna according to at least one aspect of the present invention.

Referring now to FIG. 8, a WLAN 800, typically a piconet comprises a plurality of network elements 802a–d, for example laptop computers, mobile telephones, or personal digital assistants (PDA) that are in wireless communication with each other, typically in the ISM band and usually employing either Bluetooth or IEEE802.11 protocols (eg. IEEE802.11b).

Each of the network elements 802a–d has a switched LMS phased array antenna 804 therein. A network element 806 that is foreign to the WLAN 800 enters within range of the WLAN 800. The network element 806 transmits data in a frequency range that interferes with the WLAN 800. Thus, it is desired that the foreign network element 806 is excluded from the WLAN 800 both for security and network performance considerations.

The switched LMS phased array antennas 804 are configured to spatially null, reject, signals from the network element 806 and also exclude the network element 806 from any significant transmission of data. Thus the foreign network element 806 is effectively excluded from the WLAN 800.

Figure 9:
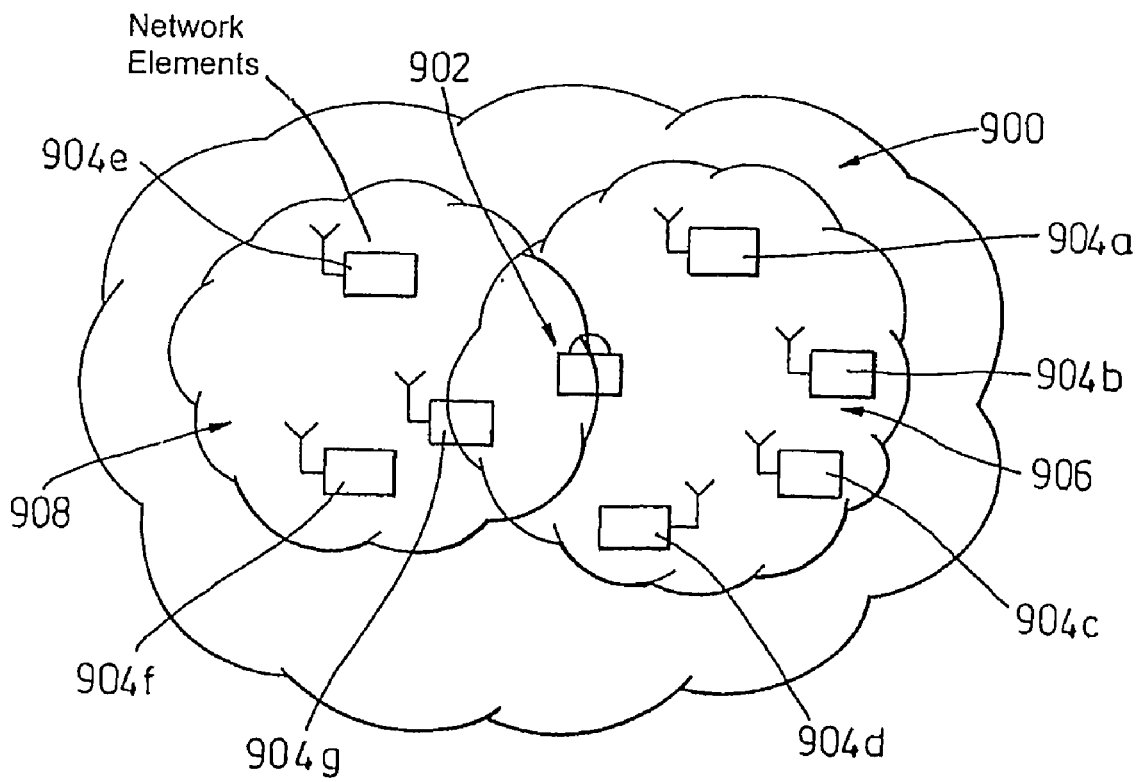
FIG. 9 is a schematic representation of a WLAN having an access point including a phased array antenna according to at least one aspect of the present invention.

Referring now to FIG. 9 a WLAN 900 comprises an access point 902 and a plurality of network elements 904a–g, for example laptop computers, mobile telephones or personal digital assistants. The network elements 904a–g are divided into two piconets 906, 908 both of which are managed by the access point 902.

The access point 902 issues identifiers 910, 912 associated with each of the piconets 906, 908 such that only a network element within the respective piconet can access data carrying the identifier. However a further data access control can be implemented by use of an access point 902 having a switched LMS phased array 914 therein as this allows the access point 902 to either spatially filter out network elements 902a–d of the first piconet 906 from datacasts to the network elements 902e–g second piconet 908. This can allow multiple piconets to operate within overlapping, or the same, frequency bands in a single geographic areas as individual piconets, or network elements, can be spatially nulled from data casts. This is in addition to the access point 902 controlling network frequency use and recycling.

Thus the invention can allow more wireless devices to operate successfully in a given area.

Also the invention provides a simplified version of the LMS algorithm for use in phased array antenna and adaptive filters. Instead of sensing all array elements a small number may be used at any one time. This will mean that an estimated gradient vector will be of reduced dimension. On each iteration a cost function will be minimised by progressing down an error surface along a limited number of its dimensions. In other words, only a subset of weights are updated at any one iteration of the algorithm whilst other weights remain frozen. By switching between the elements that are used for adaptation a minimum of the error surface will eventually be reached—giving an identical result to that which would be obtained if all the weights were adapted at each iteration.

This approach has the effect of reducing the total hardware and computational processing requirements of the adaptive processor at the expense of a longer adaptation time. However, in slow moving environments the extra gain in terms of system cost will outweigh the loss in antenna responsiveness.

In the limit the algorithm will function with only a single element being switched and adapted at a time. In this case, for an n element array, only a single ADC is required as opposed to n for conventional LMS. In addition, the computational requirements of the algorithm become minimal since only simple multiplication/additions are required instead of manipulation of vector qualities.

It will further be appreciated that the architecture and methods described hereinbefore are not limited to adaptive beamforming for phased array antenna but have general applicability in the field of adaptive filters.

The invention claimed is:

1. A signal processing system comprising:
   a plurality of input channels for the reception of inputs signals;
   a weighing system for applying weights to signals received by the input channels;
   a beamformer for beamforming the weighted signals;
   a sampling system, adapted to sample a subset of the input signals at any one time, for sampling the input signals prior to their being weighted;

a processor adapted to process outputs from the sampling system and to generate weights for the weighting system;

wherein the processor is adapted to use the subset in generating the weights, wherein successive samples may be from a different subset, such that the subset includes at least one input channel determined to make a significant contribution to a reduction in an error function associated with an output of the beamformer.

2. A system according to claim 1 wherein an input channel making significant contribution to the reduction of the error function constitutes an input channel which, when ranked by contribution to the reduction of the error function, is within any one of the following top percentiles of the sampled signals: 1%, 5% 10%, 25%, 50%.

3. A system according to claim 1 wherein there are provided a maximum of four samplers in the sampling system.

4. A system according to claim 1 wherein the sampling system comprises a switch arranged to select a subset of the input channels for digitisation.

5. A system according to claim 1 wherein the sampling system is adapted to select a maximum of half the number of input channels for digitisation at a given time.

6. A system according to claim 1 wherein the sampling system is arranged to sample the subset of input channels at the end of a symbol period.

7. A system according to claim 1 wherein the processing means is arranged to determine which input channel has the largest contribution to the reduction of the error function and use the signal from said channel in the error minimisation routine.

8. A telecommunications system including a signal processing system according to claim 1 wherein the telecommunications system is a WLAN.

9. A system according to claim 8 wherein the signal processing system is an access point that is arranged to spatially null a network element from a piconet.

10. A system according to claim 1 wherein the sampling system is adapted to select a single input channel at a given time.

11. A method of signal processing comprising the steps of:
a method of signal processing comprising the steps of:
  i) receiving a plurality of input signals, weighing the input signals and beamforming the weighted input signals to form a beam;
  ii) sampling a subset of the input signals prior to their being weighted;
  iii) processing the sampled subset to generate weights for weighting the input signals; and
  iv) repeating steps i) to iii) using successive samples wherein:
  successive samples may be from a different subset such that the subset includes at least one input channel determined to make a significant contribution to a reduction in an error function associated with the beam from the beamformer.

12. The method of claim 11 wherein the subset determined to make a significant contribution to the reduction in an error function associated with the beam is a subset containing an input channel which, when ranked by contribution to the reduction of the error function, is within any one of the following top percentiles of the sampled signals: 1%, 5% 10%, 25%, 50%.

13. The method of claim 11 wherein steps i) to iii) are repeated in order to obtain a minima in the error function.

14. The method of claim 11 wherein the input having the greatest effect on the reduction in the error function is included within the subset.

15. A method of increasing the number of users that can access a telecommunications channel of a given bandwidth incorporating the method of claim 11.

16. A method of adaptive filtering comprising obtaining a sample signal, or signals, from a plurality of channels and using the sample signals to form at least one weighting coefficient for at least one of the channels, the weighting coefficients being obtained by performing an error function reduction iteration associated with the difference between the sampled signal, or signals, and a reference values, the error function being reduced by operating on a sample signal, or signals, from a subset of the available channels that is smaller than the number of available channels, and changing the channel, or channels, present in the subset between at least two iterations of the reduction of the error function.

17. The method of claim 16 including providing switching means to switch between subsets of channels.

18. The method of claim 16 including providing a subset of channels that is significantly smaller than the total number of channels.

* * * * *

UNITED STATES PATENT AND TRADEMARK OFFICE
CERTIFICATE OF CORRECTION

PATENT NO. : 7,177,363 B2 Page 1 of 1
APPLICATION NO. : 10/507449
DATED : February 13, 2007
INVENTOR(S) : Fletcher et al.

It is certified that error appears in the above-identified patent and that said Letters Patent is hereby corrected as shown below:

On The Title Page; Item (73) Assignee
At (73) Assignee: delete "Qineteq" and replace with -- QinetiQ --

Signed and Sealed this

Eighth Day of May, 2007

JON W. DUDAS
*Director of the United States Patent and Trademark Office*